No. 711,605. Patented Oct. 21, 1902.
W. T. WELLS.
APPARATUS FOR TREATMENT OF DISEASES.
(Application filed Feb. 11, 1901.)
(No Model.) 2 Sheets—Sheet 1.

WITNESSES: J. B. Bradshaw B. J. Blackmon

INVENTOR William T. Wells BY C. C. Shepherd ATTORNEY

No. 711,605.  
W. T. WELLS.  
APPARATUS FOR TREATMENT OF DISEASES.  
(Application filed Feb. 11, 1901.)
(No Model.)  
Patented Oct. 21, 1902.  
2 Sheets—Sheet 2.
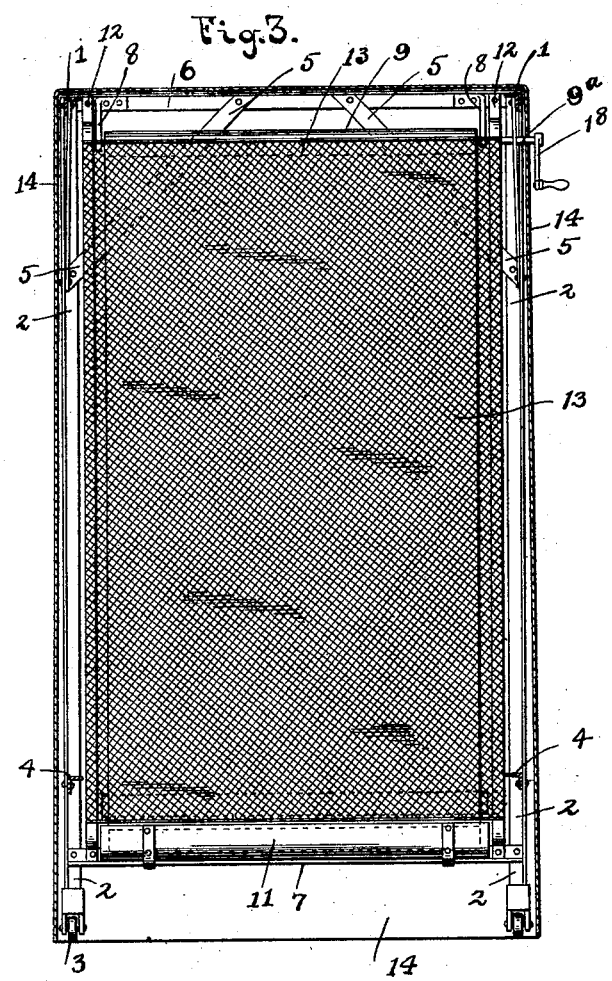
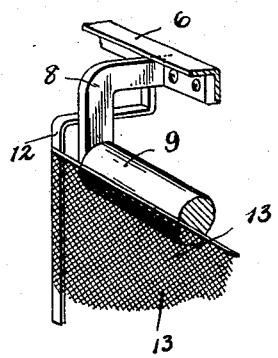
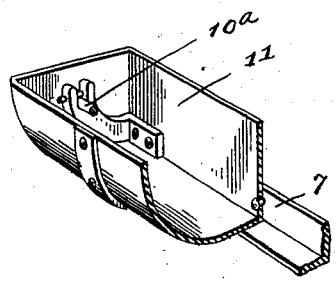
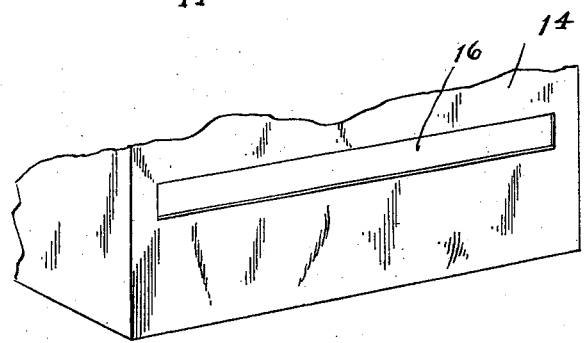
WITNESSES:  
H. B. Bradshaw  
B. J. Blackmon
INVENTOR  
William T. Wells  
BY  
C. C. Shepherd  
ATTORNEY
THE NORRIS PETERS CO., PHOTO-LITHO., WASHINGTON, D. C.

UNITED STATES PATENT OFFICE.

WILLIAM T. WELLS, OF COLUMBUS, OHIO.

APPARATUS FOR TREATMENT OF DISEASES.

SPECIFICATION forming part of Letters Patent No. 711,605, dated October 21, 1902.

Application filed February 11, 1901. Serial No. 46,827. (No model.)

*To all whom it may concern:*

Be it known that I, WILLIAM T. WELLS, a citizen of the United States, residing at Columbus, in the county of Franklin and State of Ohio, have invented a certain new and useful Improvement in Apparatus for Treatment of Diseases, of which the following is a specification.

My invention relates to the improvement of patient-inclosing cabinets for the treatment of diseases; and the objects of my invention are to provide an improved cabinet of this class of superior construction and arrangement of parts, to provide in conjunction therewith improved means for medicinally charging the atmosphere within the cabinet, and to produce certain improvements in details of construction and arrangement of parts which will be more fully pointed out hereinafter. These objects I accomplish in the manner illustrated in the accompanying drawings, in which—

Figure 1:
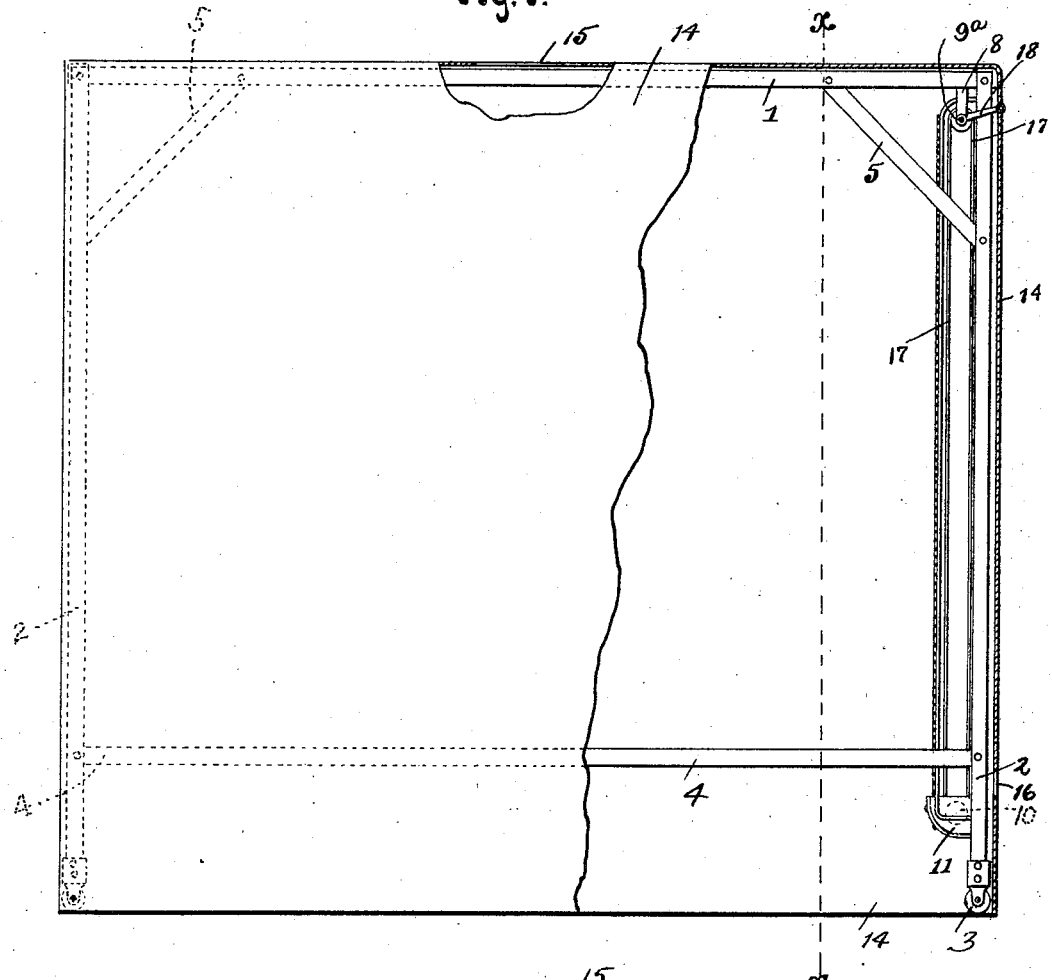
Figure 2:
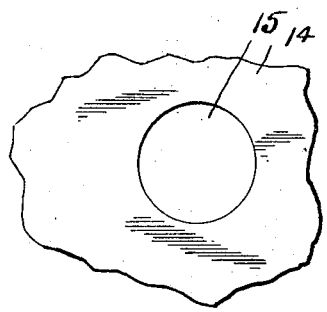

Figure 1 is a side elevation of my improved cabinet, showing for the sake of clearness a portion of the cabinet-frame cover broken away. Fig. 2 is a plan view of a portion of the upper side of the cabinet, showing the outlet-opening therein. Fig. 3 is a sectional view on line $x\,x$ of Fig. 1. Fig. 4 is a detail view in perspective, showing a section of the cabinet-frame and parts connected therewith. Fig. 5 is a similar view of a portion of the liquid-antiseptic reservoir, and Fig. 6 is a view in perspective of the lower portion of the forward end of the cabinet-covering.

Similar numerals refer to similar parts throughout the several views.

In carrying out my invention I construct an upright framework consisting of upper horizontal and parallel bars 1, which may be in the nature of angle-bars, as shown. With the ends of these horizontal upper bars are connected the downwardly-extending vertical bars 2, which form the corner posts or bars of the structure, these corner-bars being preferably provided at their lower ends with suitable casters or rollers 3. The vertical bars 2 on each side of the frame are connected by horizontally-arranged bars 4, while diagonally-arranged brace-bars 5 are preferably employed to connect the upper portions of the standards 2 with the upper horizontal bars 1. At each end of the frame the vertical standards 2 are connected by upper and lower transverse frame-bars 6 and 7. Depending from the bar 6, near each end thereof and within the frame, are angular bracket-arms 8, in the lower portions of which are journaled the ends of a transverse roller 9. A similar roller 10 is, as indicated in dotted lines in Fig. 1, journaled in the lower portion of the corresponding end of the frame, said lower roller being journaled within a trough-like reservoir or receptacle 11, which is supported on the inner side of the frame from the transverse frame-bar 7, a portion of one of the end standards of said lower roller being indicated in Fig. 4 of the drawings at $10^a$.

Supported between two frame-bars 12, which extend vertically between the bars 6 and 7 and on the inner sides of the rollers 9 and 10, is a transverse screen-frame 13, which may be of finely-woven screen-wire or of other suitable material.

Over the frame-body formed of the horizontal and vertical bars 1, 2, 4, 6, and 7 is dropped a cover 14 of suitable fabric, this cover being provided in its upper side with an opening 15 of desirable size and in the lower portion of that end which is adjacent to the receptacle 11 with a transverse opening 16. This cover 14, as indicated in the drawings, is adapted to inclose the main frame. Running over the rollers 9 and 10 is an endless apron or wide belt 17, which may be formed of suitable fabric or moisture-carrying material. As indicated at $9^a$, I provide the roller 9 at one end with an extended spindle, which passes through the cover 14 and which may have secured on its outer end an operating-crank 18.

In utilizing my device the main frame and cover thereof are made to inclose the patient to be treated. The reservoir 13 is supplied with a desirable quantity of suitable liquid antiseptic or germicidal fluid. The rotation of the crank 18 and consequent rotation of the rollers 9 and 10 and traveling of the apron 17 results in a certain proportion of the liquid or fluid contained in the reservoir 11 being carried upward on said apron in rear of the screen and in the air, which enters the frame-cover through the opening 16 or which may be contained within said cover, becoming impregnated with the chemical solution with which the apron is saturated. In this manner it will be seen that the air inhaled by the patient within the frame is medicinally charged and that the warmer exhaled air rises and passes out through the outlet-opening 15 in the top of the cover.

Owing to the employment of the screen-frame it will be seen that the patient and bed are protected to a desirable extent against any spray or unvaporized liquid which may be thrown from the apron.

In constructing the main frame of my device the various bars composing the same are preferably bolted or otherwise detachably connected, so as to permit said frame being readily taken apart for transportation.

It is obvious that the apparatus herein shown and described is of especial utilty in the treatment of diseases of the lungs and throat or other diseases of a germ origin.

Having now fully described my invention, what I claim, and desire to secure by Letters Patent, is—

In an apparatus for treatment of diseases, the combination with a framework adapted to inclose a patient and comprising united vertical and horizontal bars and a flexible cover therefor having an opening in its upper side, of rollers 9 and 10 journaled respectively in the upper and lower portions of said frame, a fluid-receptacle within which said lower roller is adapted to rotate, an endless apron connecting said upper and lower rollers, means whereby a rotary motion may be imparted to said rollers and a screen as described arranged on the inner sides of said rollers, substantially as specified.

WILLIAM T. WELLS.

In presence of—
C. C. SHEPHERD,
W. L. MORROW.